United States Patent [19]

Hunger et al.

[11] Patent Number: 4,655,651

[45] Date of Patent: Apr. 7, 1987

[54] DRILL BIT FOR HAND-HELD DRILLING MACHINES

[75] Inventors: Josef Hunger, Olching; Gerhard Rumpp, Inning, both of Fed. Rep. of Germany

[73] Assignee: Hilti Aktiengesellschaft, Fürstentum, Liechtenstein

[21] Appl. No.: 763,811

[22] Filed: Aug. 8, 1985

[30] Foreign Application Priority Data

Aug. 9, 1984 [DE] Fed. Rep. of Germany ....... 3429419

[51] Int. Cl.[4] ........................ B23B 31/06; B23B 51/02

[52] U.S. Cl. .................................... 408/226; 279/19.5

[58] Field of Search .................... 408/226, 239 R, 240; 279/19, 19.1-19.7, 22; 173/132; 175/395

[56] References Cited

U.S. PATENT DOCUMENTS 2,039,855 5/1936 Stone ................................ 279/89 X
4,047,722 9/1977 Nielsen et al. ...................... 279/19.5
4,512,692 4/1985 Nielsen .......................... 279/19.5 X

FOREIGN PATENT DOCUMENTS

G8337365.9 3/1984 Fed. Rep. of Germany .

*Primary Examiner*—Gil Weidenfeld
*Assistant Examiner*—Steven C. Bishop
*Attorney, Agent, or Firm*—Toren, McGeady and Goldberg

[57] ABSTRACT

A drill bit with an axially elongated shank is suitable for use in all known conventional hand-held drilling machines. The shank is generally cylindrically shaped with axially extending first grooves open at the free rear end face of the shank. Axially extending second grooves are superimposed at least in part on the first grooves and are spaced from the rear end face. Each second groove forms at least one shoulder face disposed transversely of the shank axis and oriented in the direction facing oppositely to the rear end face. Accordingly, the drill bit, due to its first grooves, can be utilized in the chucks presently used in drilling machines and percussion drilling machines. Further, due to the second grooves, the drill bit can be clamped for limited axial movement in the chucks of known hammer drills.

5 Claims, 4 Drawing Figures

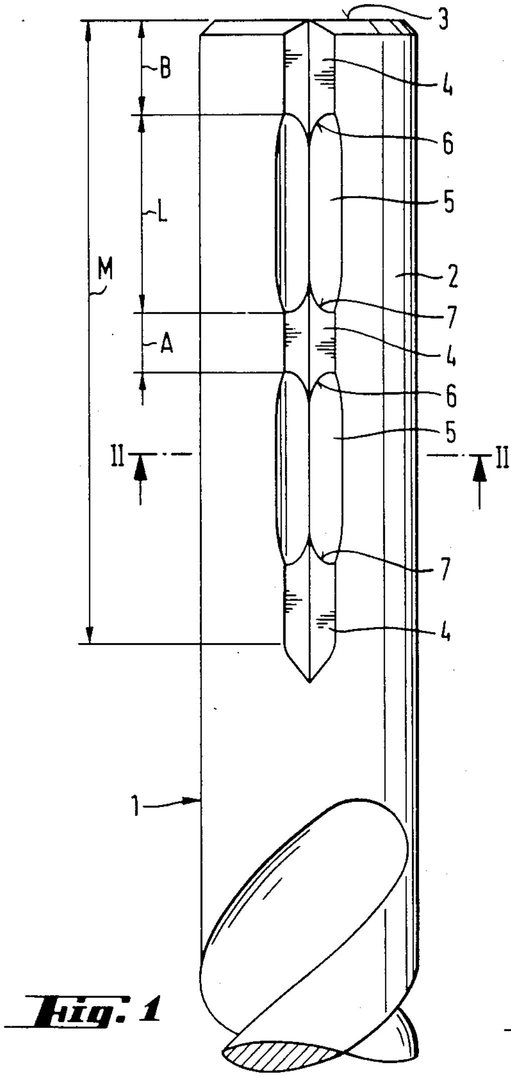
Fig. 1
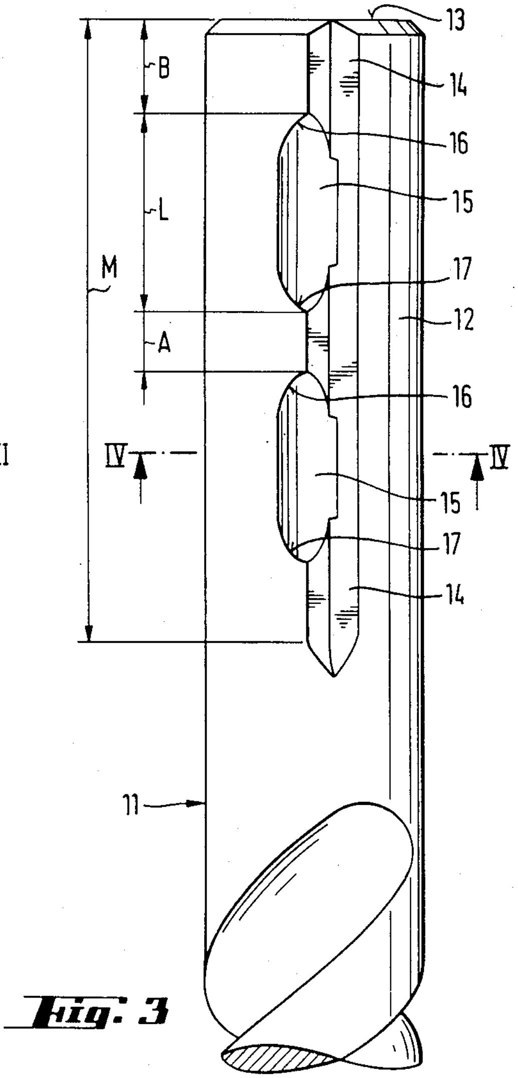
Fig. 3
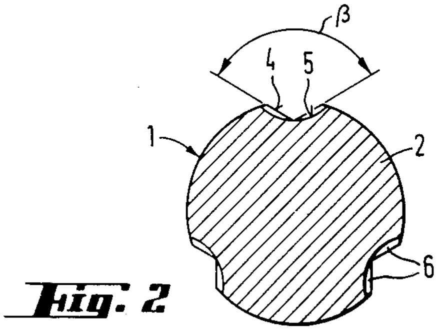
Fig. 2
Fig. 4
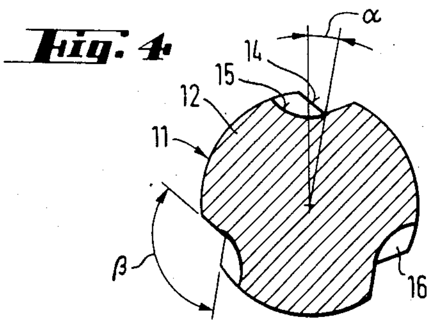

DRILL BIT FOR HAND-HELD DRILLING MACHINES

BACKGROUND OF THE INVENTION

The present invention is directed to a drill bit with a generally axially extending cylindrically shaped shank for use in hand-held drilling machines.

Known hand-held drilling machines used to cut bores in a hard surface material, such as concrete, rock and the like, can be divided into three groups, that is, drilling machines, percussion drilling machines and hammer drills.

Plain drilling machines are of only secondary importance at the present time and are simple hand tools which merely impart a rotary motion to an inserted drill bit. In such drilling machines, a clamping chuck is used for receiving the drill bit with the generally cylindrically shaped shank of the bit clamped in the chuck.

Percussion drills also use a clamping chuck in which the drill bits used in drilling machines can also be clamped. The difference between a percussion drill and a plain drilling machine is that in a percussion drill the chuck is positioned on an axially displaceable spindle which experiences a reciprocating movement during the drilling operation. The reciprocating movement is developed in the drilling tool by ratchet discs and is transmitted by the chuck to the drill bit tightly clamped in it.

At the present time, hammer drills experience the greatest use in drilling hard surface materials. Such drilling devices also have a chuck, however, unlike plain drilling machines and percussion drilling machines, the drill bit is held so that it is movable axially to a limited extent while it is positively locked for the transmission of rotational movement. By elements located in the hammer drill, such as an electro-pneumatic percussion mechanism, a piston is reciprocated back and forth for imparting a percussion force to the drill bit either directly or by the interposition of another piston. Because of the axial displaceability with respect to the chuck, no percussive force is transmitted to the chuck and the entire percussive energy is available for the drilling operation.

To positively lock and clamp drill bits in hammer drills, it is conventional to form the drill bits with a standard shank containing entrainment faces or surfaces for radially displaceable locking elements in the chuck. Since such a standard shank has resulted in considerable cost increases for the drill bit, recently variable shanks have been developed. Such shanks are clamped in the chucks by means of entrainment surfaces in the shank with the chucks displaying a variable guidance area and counter surfaces for the entrainment surfaces formed in the drill bits.

Since hammer drills have considerable advantages in use as compared with percussion drilling machines, and because the development of variable shanks has rendered the drill bits more favorable from an economic point of view, hammer drills have, to a considerable extent, replaced percussion drilling machines. As a result, an organization using drilling devices often has both percussion drilling machines as well as hammer drills. Accordingly, based on the present trend, as a rule, only drill bits for hammer drills will be purchased so that there is the requirement that such drill bits can also be used in percussion drilling machines.

For solving this problem a drill bit is known having a shank containing grooves for forming the entrainment surfaces arranged in such a manner that the clamping jaws of a chuck can not engage in the grooves, if such a drill bit is inserted into a percussion drill. As a result, the same situation exists as when a drill bit with a cylindrical shank is clamped in a percussion drill, since because of the pure frictional lock that is required there must be a considerable clamping force exerted by the chuck. Since only reciprocating movement acts axially on the drill bit, the forces exerted in the axial direction are of no significance, rather the significant forces are those required for the transmission of torque. Accordingly, if insufficient clamping forces are exerted by the chuck, there is the danger that the requisite torque is not completely transmitted to the drill bit and the drill bit may turn relative to the chuck. While such a drill bit may be used in all types of drilling devices, it does not provide any improvement over the conventional tool if it is employed in percussion drilling machines.

To improve drill bits for use in different types of drilling machines another known solution has provided the drill bit shank with a relatively long groove closed at the trailing end of the bit for forming entrainment surfaces. While the use of such a drill bit in a hammer drill results in the same situation as in the previously discussed drill bit, it is expected that with this arrangement of the groove an improvement for use in percussion drilling machines can be obtained. In a limited number of chucks, that is, in chucks where the rear end of the clamping jaws are spaced a sufficient distance from the abutment face on the chuck side for the trailing end face of the drill bits, an advantage is achieved in that the clamping jaws can extend completely into the grooves in the shank of the drill bit. In a large number of clamping chucks, presently on the market, such a distance or spacing is not present and the clamping jaws can not extend into the grooves, because of the closed end of the grooves required for use in hammer drills.

Apart from the disadvantage that there is insufficient rotational entrainment, there is another disadvantage in that the drill bit is in contact with the clamping jaws along a relatively short distance so that a ball joint is created which causes the drill bit to turn out of round by a considerable amount.

SUMMARY OF THE INVENTION

Therefore, the primary object of the present invention is to provide a drill bit which can be easily produced and used in all types of hand-held drilling machines and one that affords sufficient retention and adequate concentric rotation.

Accordingly, the drill bit embodying the present invention has the following features:

(a) The shank has at least one axially extending first groove open at the free end face of the drill bit shank.

(b) The shank has at least one axially extending second groove spaced from the free rear end face of the shank.

(c) Preferably the second grooves are arranged in a superimposed manner in the first grooves and form a shoulder surface facing in the opposite direction from the rear end face of the shank.

Based on the above combination of features, in accordance with the present invention, at least one axially elongated first groove is open at the free rear end face of the shank. In addition, at least one axially elongated second groove is superimposed on the first groove and is in spaced relation from the rear end face. The second groove has closed ends extending transversely of the axial direction. As a result, the shank is formed with one or more double-function first-second grooves. The axially elongated first groove open at the free rear end face of the shank assures that the clamping jaws of any type of chuck can completely engage within the first groove and afford, in addition to rotational entrainment, an adequate guidance for the concentric rotation of the drill bit. Accordingly, where axial retention of the drill bit is of secondary importance, such as when using the drill bit in a percussion drilling machine, it is possible to assure a pure frictional lock for effecting rotational entrainment of the drill bit.

In hammer drills it is required that the drill bit experience limited axial displaceability in addition to being rotated. A hammer drill chuck has, in addition to a variable guidance region, counterfaces on protrusions or locking members which afford radial engagement into the axially extending grooves at a location spaced from the free rear end face of the shank. The limitation on the axial displaceability is afforded by shoulder faces or surfaces at the opposite end of the axially extending grooves, however, only the shoulder surface directed in the opposite direction relative to the surface of the free rear end face of the shank has any significance. As indicated in the following description, the shoulder face or surface can be provided in a variety of ways by superimposing the second grooves on the first grooves.

In accordance with the present invention, both the first and second grooves can have the same general cross-sectional shape with the shoulder surfaces being formed by only a partial superimposition or overlapping of the grooves. In accordance with another embodiment of the invention, the first groove open at the free rear end face of the shank can have a smaller cross-sectional area than the second groove which is spaced from the free rear end face so that the shoulder faces are formed even if the first and second grooves are arranged symmetrically relative to one another.

While the area of the shoulder surfaces may turn out to be relatively small in a symmetrical arrangement of the first and second grooves, if there is only a partial superimposition of the grooves a different cross-sectional area arrangement of the shoulder surfaces can be effected. In a preferred embodiment where there is only a partial overlap of the second groove on the first groove the first grooves open at the free rear end face of the shank are offset relative to the second grooves opposite to the direction of rotation. This specific offset along with the different cross-sectional area of the grooves affords a considerable increase in the shoulder surfaces, in particular if for the adequate guidance of the drill bit during percussion drilling it is necessary that the bottom of the first groove can not be interrupted by the second groove. The proposed offset arrangement assures that the shoulder surface formed by the second groove and facing in the direction opposite to the surface of the free rear end face of the shank, due to the torque acting on the drill bit, assures that the countersurfaces on the protrusions or locking elements of the chuck are made to abut the shoulder surfaces in the second groove to a preponderant degree. The provision of the shoulder surfaces has a considerable effect upon the service life of the shank when the drill bits are primarily used in hammer drills. Considering the different diameters of the shanks as well as the dimensions and shape of the first and second grooves, an angular offset of the grooves in the region of 8° to 15° has been found to be suitable.

Based on another drill bit which has proved to be effective for use in hammer drills, another feature of the invention is to provide a number of the second grooves in spaced relation along the first grooves. With such an arrangement there is the particular advantage that the number of shoulder surfaces and thus the overall abutment surface for effecting limited axial displaceability of the drill bit can be increased in hammer drills. As a compromise arrangement considering on one hand the number of shoulder surfaces and on the other the fabrication costs, two axially spaced second grooves positioned along one first groove has proven to be especially effective.

With regard to the dimensioning of the second grooves, that is, the grooves spaced from the free rear end face of the shank, it is preferable if the adjacent ends of the second grooves are spaced apart in the range 0.2 to 0.8 times the diameter of the shank. The spacing between the free rear end face of the shank and the adjacent end of the second groove, that is, the end of the second groove closer to the rear end face is in the range of 0.3 to one times the diameter of the shank. The length of the second grooves in the axial direction of the shank is in the range of 1.2 to three times the diameter of the shank. The dimensions of the first grooves, that is, the grooves which open through the free rear end face of the shank, is determined by the conventional chucks available on the market end and such grooves have a preferred length in the range of three to twelve times the diameter of the shank. With regard to a specific dimension, all of the conventional chucks presently available on the market are covered when the first grooves have a length of approximately 45 mm.

With regard to the chucks presently available, the drill bit shank is provided with three or a multiple of three first grooves equi-angularly spaced apart around the circumferential surface of the shank.

Preferably, the first grooves which open through the free rear end face of the shank have a V-shaped cross-section extending transversely of the axial direction of the shank while the second grooves spaced from the rear end face have a circular arc-shaped cross-section extending transversely of the shank axis. Since the clamping jaws in conventional percussion drilling machine chucks are equi-angularly spaced apart at 120°, the first grooves with the V-shaped cross-section can enclose an identical angle or a slightly smaller angle, that is, in the range of 100° to 120°. By reducing this angle, the retention of the drill bit is improved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of the shank of a drill bit embodying the present invention;

FIG. 2 is a sectional view taken along the line II—II of FIG. 1;

FIG. 3 is a view similar to FIG. 1 illustrating the shank of another drill bit embodying the present invention; and FIG. 4 is a sectional view taken along the line IV—IV in FIG. 3.

DETAILED DESCRIPTION OF THE INVENTION

In FIGS. 1 and 2 an axially elongated drill bit 1 is illustrated having an axially elongated shank with a generally cylindrically shaped circumferential surface. As can be seen best in FIG. 2, shank 2 has three elongated axially extending first grooves 4 equi-angularly spaced around the circumferential surface of the shank and with the grooves being open through the free rear end face 3 on the shank. The first grooves 4 have a V-shaped cross-section transversely of the axial direction of the shank. Axially extending second grooves 5 are superimposed on each of the first grooves 4 in a symmetrical manner and the second grooves are spaced axially from the free rear end face 3. The second grooves 5 have an axial dimension significantly less than that of the first groove on which they are superimposed. As can be seen in FIG. 1, there are two second grooves 5 arranged one following the other and spaced apart in the axial direction of the shank in each first groove 4.

As can be seen in FIGS. 1 and 2, the transverse cross-sectional area of the first grooves 4 is smaller than the transverse cross-sectional area of the second groove 5 affording shoulder surfaces 6, 7 located at the opposite ends of the grooves 5 and extending transversely of the axial direction of the shank. These shoulder surfaces 6, 7 limit the axial displaceability when the drill bit 1 is used in hammer drills, that is, where the hammer drills contain a known chuck with adjustable clamping jaws.

The shoulder surfaces 6 of each second groove, that is, the shoulder surface of the groove located closer to the free rear end face of the shank 3, is particularly important, since it must absorb the blows of the percussion piston used in the hammer drill which impacts the drill bit 1 while the bit is being withdrawn from the surface of the material being drilled. The shoulder surface 7 at the opposite end of the second groove 5 is hardly subjected to any load since the blows of the percussive piston act opposite to these surfaces.

As is clear from FIGS. 1 and 2, the axially extending first grooves 4 which open through the rear end face 3 provide a continuous groove bottom which extends through the axially extending second grooves 5 spaced from the rear end face 3. Due to the continuous groove bottom, in each case a concentric guidance is achieved if the drill bit 1 with such a shank 2 is used in a percussion drilling machine, independently of the axial position of the clamping jaws on the chuck.

In FIGS. 3 and 4 an axially extending drill bit 11 is provided with an axially extending shank 12. As can be seen best in FIG. 4, the shank 12 is provided with three axially extending equi-angularly spaced first grooves 14 each having a V-shaped transverse cross-section. The first grooves 14 extend along the cylindrically shaped circumferential surface of the shank 12. As illustrated in FIG. 1, the first groove 14 has two axially extending, closed-ended second grooves 15 spaced apart from one another with the rearward second groove spaced axially from the free rear end face 13 of the shank. The second grooves 15 spaced from the rear end face 13 are offset in the direction of rotation of the drill bit 11 with respect to the center of the first grooves 14 with the angle of offset $\alpha$ of the axis of symmetry of the first and second grooves 14 and 15 being in the range of about 8° to 15°, note FIG. 4. In the region of the transition between the first grooves 14 and the second grooves 15 shoulder surfaces 16, 17 are formed by the opposite ends of the second grooves 15 and these surfaces have an asymmetrical design, as compared to the embodiment in FIGS. 1 and 2, due to the offset arrangement of the grooves.

As mentioned above, in particular the shoulder surface 16 facing in the opposite direction from that of the surface of the rear end face 13 is of special importance when the drill bit 11 is used in a hammer drill. In the first and second grooves 14, 15 are offset as described, the asymmetrically arranged shoulder surface 16, due to the torque acting on the drill bit, is juxtaposed to the countersurfaces of the protrusions or locking elements of the clamping jaw of the chuck and these surfaces abut one another.

Due to the offset arrangement of the axially elongated first and second grooves 14, 15, the shoulder surface 16 afforded by the second grooves can be considerably influenced as far as its magnitude is concerned. On one hand, the size of the cross-sectional areas can be varied and the size can also be effected by the degree of offset. As a result, though the grooves may have an identical cross-sectional shape, an adequately large shoulder surface 16 is afforded due to the offset arrangement.

The offset arrangement of the first and second grooves 15 transversely of the axial direction of the shank along with the spaced relationship of the second grooves from the free rear end face 13 of the shank assures that an adequate circumferential surface of the shank 12 remains in spite of the presence of the first grooves open at the rear end face 13. As can be seen in FIG. 4, about half of the width of the surface contour of the second grooves 15 remains. This remaining surface contour affords the guidance of the drill bit 11 in known hammer drill chucks utilizing adjustable clamping jaws in the same manner as if the first grooves 14 did not exist. Such guidance of the surface contour is of particular importance if drill bits 11 of larger diameters are used in hammer drills. Accordingly, the wear on the shank 12 can be considerably reduced and the accuracy of the concentric rotation of the drill bit 11 can be improved.

As indicated in FIGS. 1 and 3, the spacing between adjacent second grooves 5, 15 in the first grooves 4, 14 is in the range of 0.2 to 0.8 times the diameter of the shank 2, 12. The distance B between the free rear end face 3, 13 of the shank 2, 12 and the adjacent end of the nearer second groove 5, 15 is in the range of 0.3 to one times the diameter of the shank 2, 12. The length L of the second grooves 5, 15 is in the range 1.2 to three times the diameter of the shank 2, 12. The overall length M of the first grooves 4, 14 is in the range of three to twelve times the diameter of the shank 2, 12.

While specific embodiments of the invention have been shown and described in detail to illustrate the application of the inventive principles, it will be understood that the invention may be embodied otherwise without departing from such principles.

We claim:

1. Drill bit for hand-held drills comprising an axially extending shank, said shank having a free end surface extending transversely of the axial direction thereof and a generally cylindrically shaped axially extending circumferential surface extending from the free end, said shank having at least one first groove formed in and extending in the axial direction of said circumferential surface, said at least first groove being open at the free surface thereof, at least one second groove formed in and extending in the axial direction of said circumferential surface and being spaced in the axial direction of said shank from said free end surface thereof, said at least one second groove being superimposed at least in part on said at least one first groove, and said at least one second groove being shaped and sized relative to said at least one first groove so that said at least one second groove forms at least one shoulder surface extending transversely of the axial direction of said shank and facing in the opposite direction from from said free end surface, the cross-sectional area of said first groove extending transversely of the axial direction of said shank is smaller than the cross-sectional area of said second groove extending transversely of the axial direction of said shank.

2. Drill bit, as set forth in claim 1, wherein said second groove is superimposed symmetrically on said first groove so that each said first groove and second groove has a coincident axis of symmetry.

3. Drill bit, as set forth in claim 1, wherein three said first grooves are formed in the circumferential surface of said shank equi-angularly spaced from one another.

4. Drill bit, as set forth in claim 1, wherein a multiple of three said first grooves are formed in the circumferential surface of said shank spaced equi-angularly apart from one another.

5. Drill bit, as set forth claim 1, wherein said second groove has a circular arc-shaped cross-section extending transversely of the axis of said shank.

* * * * *